United States Patent [19]
Oshiba et al.

[11] Patent Number: 5,285,433
[45] Date of Patent: Feb. 8, 1994

[54] APPARATUS WITH POSITION DETECTING MEANS FOR RECORDING AND/OR REPRODUCING DATA ON AND/OR FROM OPTICAL CARD

[75] Inventors: Mitsuo Oshiba; Toshio Horiguchi, both of Hachioji, Japan

[73] Assignee: Olympus Optical Co., Ltd., Tokyo, Japan

[21] Appl. No.: 740,553

[22] Filed: Aug. 5, 1991

Related U.S. Application Data

[63] Continuation-in-part of Ser. No. 654,803, Feb. 13, 1991, abandoned.

Foreign Application Priority Data

Aug. 6, 1990 [JP] Japan .................. 2-208382

[51] Int. Cl.⁵ .................................. G11B 7/00
[52] U.S. Cl. .................. 369/44.26; 369/44.28; 235/476; 235/494
[58] Field of Search ............... 369/44.11, 44.27, 44.28, 369/48, 50, 59, 44.26; 235/454, 475, 476, 479, 494

[56] References Cited

U.S. PATENT DOCUMENTS

| | | | |
|---|---|---|---|
| 4,817,067 | 3/1989 | Takahashi et al. | 369/44.26 |
| 4,885,458 | 12/1989 | Horiguchi et al. | 235/454 |
| 4,896,025 | 1/1990 | Hasegawa | 235/434 |
| 4,910,725 | 3/1990 | Drexler et al. | 369/59 |
| 4,952,786 | 8/1990 | Inoue | 235/454 |
| 4,958,339 | 9/1990 | Koyama et al. | 235/454 |
| 4,985,616 | 1/1991 | Nakamura et al. | 235/454 |
| 5,038,332 | 8/1991 | Sakagami et al. | 369/59 |
| 5,142,519 | 8/1992 | Horie | 235/454 |

FOREIGN PATENT DOCUMENTS

| | | |
|---|---|---|
| 2-201738 | 8/0990 | Japan . |
| 2-210617 | 8/1990 | Japan . |
| 2-244425 | 9/1990 | Japan . |

Primary Examiner—Donald E. McElheny, Jr.
Attorney, Agent, or Firm—Armstrong, Westerman, Hattori, McLeland & Naughton

[57] ABSTRACT

In an apparatus for recording and/or reproducing data on and/or from an optical card having a plurality of tracks, each of which includes a data portion and ID portions provided at both ends of the data portion, in said data portion the data is recorded in a plurality of sectors in a reciprocal manner by projecting from an optical head a recording or reproducing light beam onto the optical card, while the optical card is moved with respect to the light beam, a relative position of the optical card with respect to the optical head is detected to derive a sector position signal. A start point of a sector for which the data will be recorded or reproduced is determined by counting the sector position signal. The sector position signal is derived by counting pulses generated by a rotary encoder coupled with the motor for moving the optical card to derive a count value and a comparator for comparing the count value with a reference value which is generated in accordance with a predetermined track format. The sector position signal may be also derived by counting PLL clock pulses which are generated on the basis of a signal obtained by reading PLL synchronizing regions in the ID portion.

28 Claims, 16 Drawing Sheets

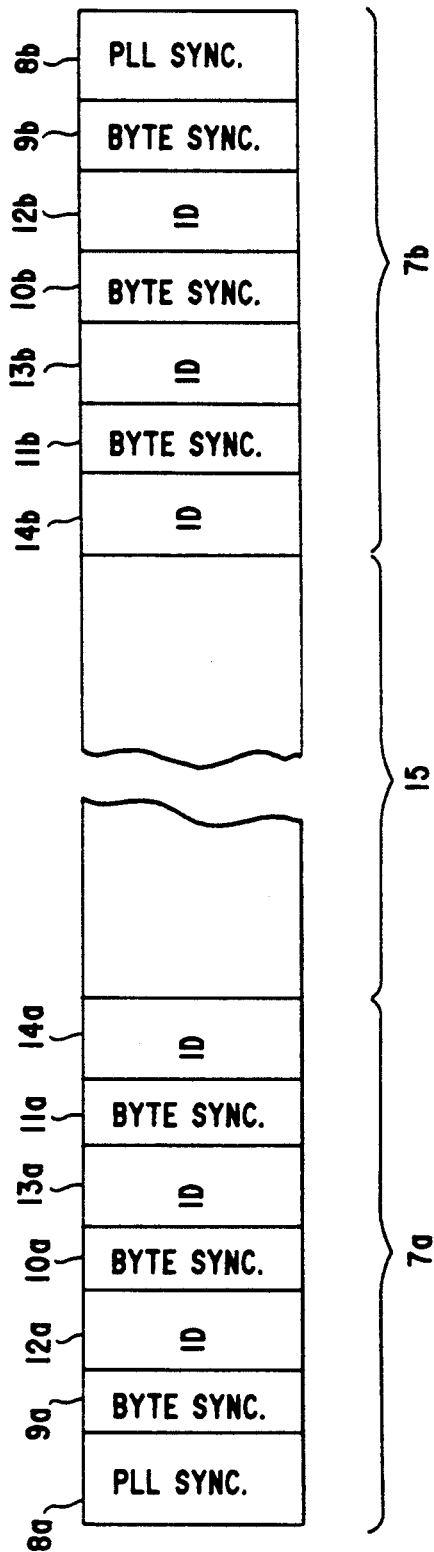

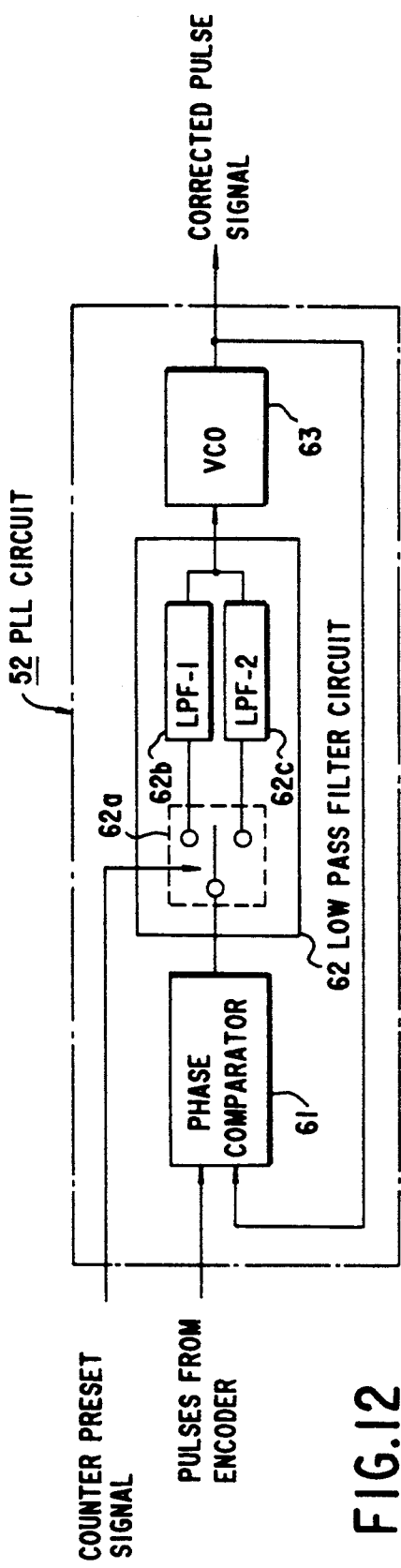
FIG.12
FIG.13A
FIG.13B

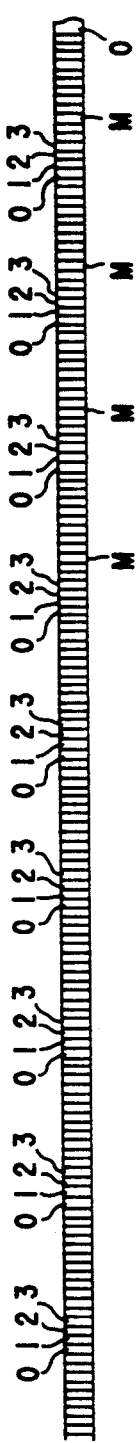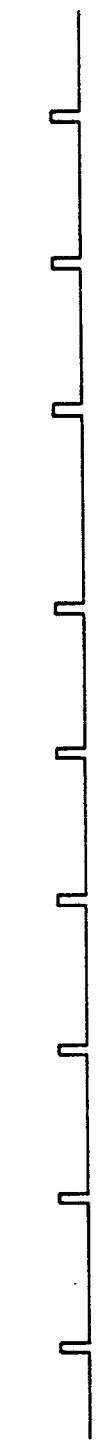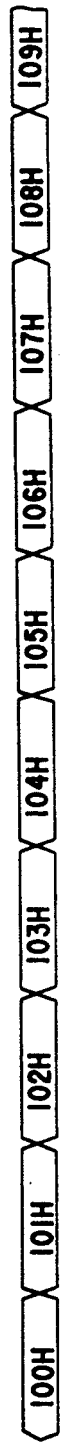
FIG.17f CORRECTED AMOUNT COUNTER
FIG.17g CORRECTED AMOUNT REGISTER
FIG.17h CORRECTED POSITION CLOCK
FIG.17i POSITION CLOCK
FIG.17j POSITION COUNTER
FIG.17k

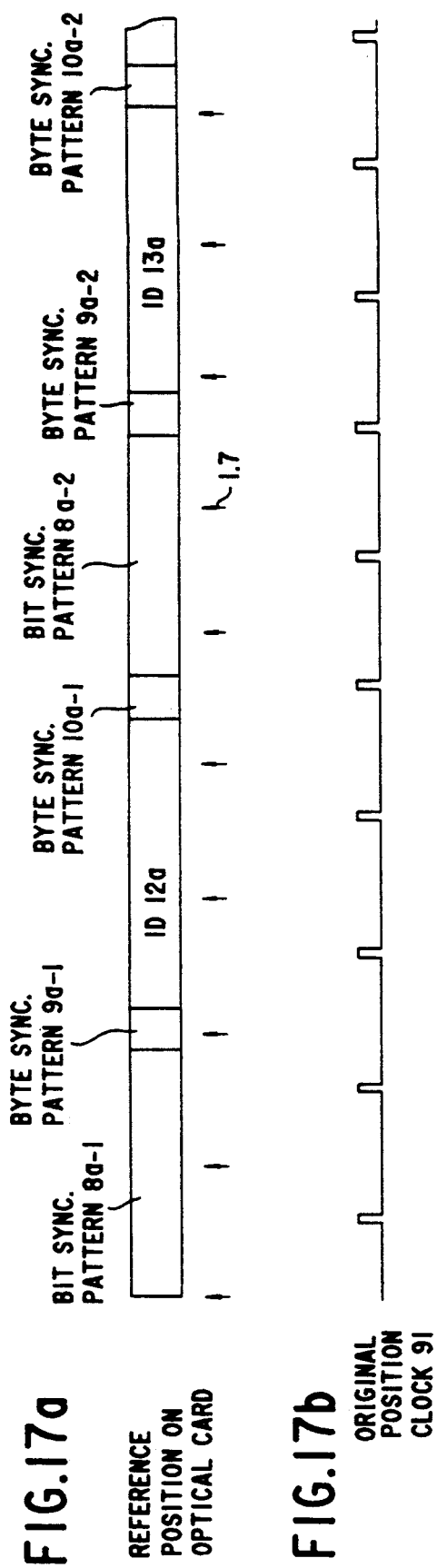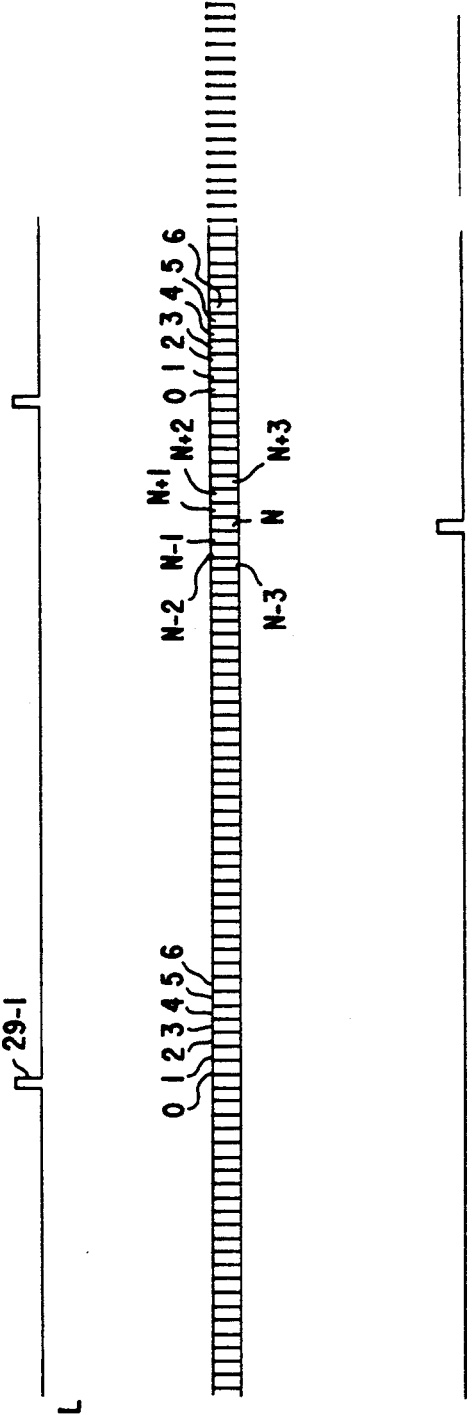

APPARATUS WITH POSITION DETECTING MEANS FOR RECORDING AND/OR REPRODUCING DATA ON AND/OR FROM OPTICAL CARD

This application is a continuation-in-part of U.S. patent application Ser. No. 654,803, filed Feb. 13, 1991, now abandoned.

BACKGROUND OF THE INVENTION

1. Field of the Invention and Related Art Statement

The present invention relates to an apparatus for recording and/or reproducing data or information on and/or from an optical card.

In the above mentioned recording and/or reproducing apparatus using the optical card, the recording and/or reproducing operation is carried out by moving the optical card having a plurality of tracks arranged in parallel with each other and an optical head including an objective lens for projecting a recording and/or reproducing light beam onto the optical card relative to each other in a reciprocal manner.

FIG. 1 is a plan view showing schematically an example of the optical card for use in the above mentioned recording and/or reproducing apparatus. An optical card 1 includes a plurality of tracks 2 which extend in a direction parallel to a longer side of the rectangular sheet-like optical card in parallel with each other. As illustrated in FIG. 2, each of the tracks 2 of a preformatted optical card consists of ID portions provided on both ends of the track and a data portion situating between the ID portions, the data being recorded in said data portion. The ID portions include ID marks 3a and 3b, respectively indicating start points of the ID portions and ID regions 4a and 4b, respectively indicating track information such as a track address. In the present optical card, the data portion includes four sectors 6a, 6b, 6c and 6d divided by five sector marks 5a, 5b, 5c, 5d and 5e. Usually these ID portions and sector marks have been pre-recorded on the optical card 1. In order to make an area of the data record region as wide as possible, the ID portions are not provided for each sectors.

When the above mentioned optical card is actually used, an amount of the data to be recorded in a track, i.e., data portion, on the optical card varies in accordance with particular applications. Therefore, in order to utilize efficiently the data record region having a limited area, it is necessary to prepare a number of track formats each having different sector sizes or lengths suitable for respective applications. In one solution for this it may be conceived that plural kinds of the sector marks are pre-recorded on a single optical card to from a plurality of track formats each having different sector lengths. However, in such an optical card, tracks having the sector sizes which are not suitable for an application are not used and thus the data record region is wasted.

In order to solve the above mentioned drawback, in Japanese Patent Laid-open Publication Kokai Sho No. 63-4476, there is proposed a recording and/or reproducing apparatus using an optical card having tracks, in which a plurality of independent data are recorded in a single track without pre-recorded sector marks for dividing the track into a plurality of sectors. In this known data recording and/or reproducing apparatus, there are formed two different kinds of tracks, one being a data track which is composed of a single sector and the other being a directory track in which a plurality of independent data for managing the recorded condition of data tracks are recorded. A known method of recording a plurality of directory data on the directory track will then be explained with reference to FIGS. 3A to 3D. FIG. 3A depicts a reproduced signal which is obtained by scanning the directory track and FIG. 3B shows an output signal of a retriggable one-shot multivibrator to which the reproduced signal is supplied. High level of the output signal of this multivibrator indicates that an area in which a single directory data block has been recorded is just reproduced. FIG. 3C illustrates a signal which is generated in response to a trailing edge of the output signal shown in FIG. 3B and lasts for a predetermined time period which corresponds to an interval between successive directory data blocks. FIG. 3D shows a new directory data block which is to be recorded on the optical card next to the last directory data block. This directory data block is generated in response to a trailing edge of the signal shown in FIG. 3C. In this manner, a start point for recording a new directory data block is determined on the basis of the end of a last recorded data block in the same track.

The known recording and/or reproducing apparatus disclosed in the above mentioned Japanese Patent Laid-open Publication Kokai Sho No.63-4476 has a problem in that an access time is liable to be long. That is to say, in the optical card, in order to shorten the access time, it is preferable that the recording and/or reproducing is effected in opposite directions of the relative movement of the optical card and optical head in a reciprocal manner. However, in the known apparatus the recording start point is determined by detecting the end point of the last recorded sector, so that the recording and/or reproducing can be performed only in one predetermined direction. This results in an increase in the the access time. Further, in the known apparatus the recording has to be effected orderly, and thus it is impossible to record a third directory data block after recording a first directory data block without recording a second directory data block. In other words, when the above explained data recording method is applied to record data in a plurality of sectors in a data track, it is impossible to record data in arbitrary sectors in the track in a random order.

SUMMARY OF THE INVENTION

The present invention has for its object to provide a novel and useful apparatus for recording and/or reproducing data on and/or from an optical card, in which data having various sector sizes can be recorded and/or reproduced for an arbitrarily selected sector in opposite directions of the relative movement of the optical head and the optical card in a reciprocal manner, so that the data record area of the optical card can be utilized efficiently, while the access time can be shortened effectively.

According to the invention, an apparatus for recording and/or reproducing data on and/or from an optical card comprises:

an optical head including an objective lens for projecting a light beam onto the optical card;

driving means for moving the optical card and optical head relative to each other in a track direction in which tracks on the optical card extend;

position detecting means for detecting a relative position of the optical card and the optical head viewed in said track direction to derive a position signal; and controlling means for receiving said position signal to derive a control signal which indicates a start point of a unit area on the optical card for which the data recording and/or reproducing is to be effected.

In an embodiment of the recording and/or reproducing apparatus according to the present invention, said position detecting means for detecting the relative position of the optical head and the optical card comprises a generator for generating phase locked loop (PLL) clock pulses in response to a signal obtained by reading a PLL synchronizing region pre-recorded in an ID portion of the optical card, and a counter for counting the PLL clock pulses to derive the position signal.

In such an apparatus, the data recording and/or reproducing start point can be determined not by the condition of one or more previously recorded sectors, but by the relative position of the optical card and the optical head obtained by counting the PLL clock pulses which are phase-locked with the signal obtained by reproducing the PLL synchronizing region in the ID portion, and therefore the data having arbitrary sector sizes suitable for various applications can be recorded and/or reproduced for arbitrary sectors in opposite directions of the relative movement of the optical card and the optical head, while it is not necessary at all to pre-record the sector marks for dividing the data portion into a plurality of sectors. Thus, the data record area of the optical card can be utilized optimally and the access time can be reduced.

In another embodiment of the recording and/or reproducing apparatus according to the invention, said position detecting means for detecting the relative position of the optical card and the optical head comprises a rotary encoder coupled with a motor for moving the optical card with respect to the optical head and generating pulses, and a counter for counting the pulses generated from the rotary encoder.

In a modification of the above mentioned embodiment of the recording and/or reproducing apparatus according to the present invention, there is provided a correcting circuit for compensating defects in the pulses supplied from the rotary encoder to produce corrected pulses and the thus corrected pulses are counted by the counter to detect the relative position of the optical card and the optical head. By using the corrected pulses it is possible to detect the relative position very accurately and thus the recording and/or reproducing ca be performed precisely without causing undesired damage of previously recorded data.

BRIEF DESCRIPTION OF THE DRAWINGS

FIGS. 3A to 3D are signal waveforms for explaining the operation of the known data recording and/or reproducing apparatus;

FIG. 4 is a schematic view illustrating a track format of an optical card for use in the recording and/or reproducing apparatus according to the invention;

FIG. 12 is a block diagram depicting the detailed construction of the PLL circuit illustrated in FIG. 11; and FIGS. 13A and 13B show defects in the pulses generated by the rotary encoder.

FIGS. 14 to 17 relate to a fourth embodiment according to the present invention. FIG. 14 is a block diagram showing the construction of the apparatus for recording and/or regenerating data on and/or from the optical card in a fourth embodiment.

FIG. 15 is a schematic view showing an example of a pre-recorded format of the optical card.

FIG. 16 is a block diagram showing the construction of the sector position detecting circuit.

FIGS. 17a–17k are a timing chart depicting a movement of FIG. 16.

DESCRIPTION OF THE PREFERRED EMBODIMENTS

Figure 1:
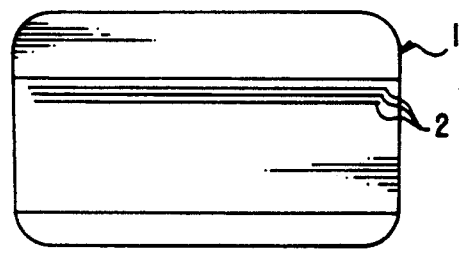
FIG. 1 is a schematic plan view showing the construction of the optical card.
Figure 2:
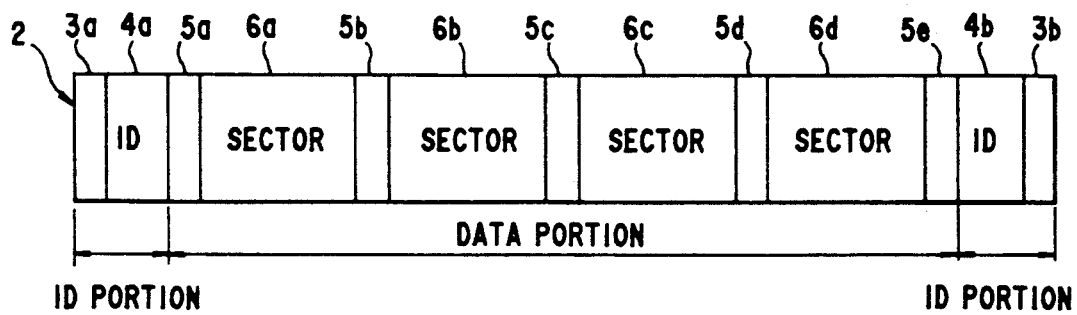
FIG. 2 is a schematic view depicting a known track format of the optical card.

FIG. 4 illustrate an example of a pre-recorded format of an optical card for use in the data recording and/or reproducing apparatus according to the present invention. It should be noted that the whole construction of this optical card is same as that of the optical card illustrated in FIG. 1. A track is composed of ID portions 7a and 7b formed at respective ends of the track and a data portion 15 in which the data is recorded or to be recorded. The left hand ID portion 7a includes a PLL synchronizing region 8a, a first byte synchronizing region 9a for indicating a start point of a first ID region 12a, a second byte synchronizing region 10a indicating a start point of a second ID region 13a, a third byte synchronizing region 11a and a third ID region 14a whose start point is denoted by the third byte synchronizing region 11a. Similarly the right hand ID portion 7b includes PLL synchronizing region 8b, first byte synchronizing region 9b, first ID region 12b, second byte synchronizing region 10b, second ID region 13b, third byte synchronizing region 11b and third ID region 14b. It should be noted that the left and right hand ID portions 7a and 7b are constructed symmetrically with respect to the data portion 15, because the data recording and/or reproducing is effected by moving the optical card with respect to the optical head in a reciprocal manner. In the present embodiment, the same track address is recorded in all the ID regions 12a, 13a, 14a and 12b, 13b, 14b in order to increase the reliability of the reproduction of the track address. Further in order to distinguish these ID regions from each other in the ID regions there are further recorded ID region numbers. In order to meet different requirements for various applications, the data portion 15 is not initially divided into sectors, so that any sector mark is not pre-recorded.

Figure 5:
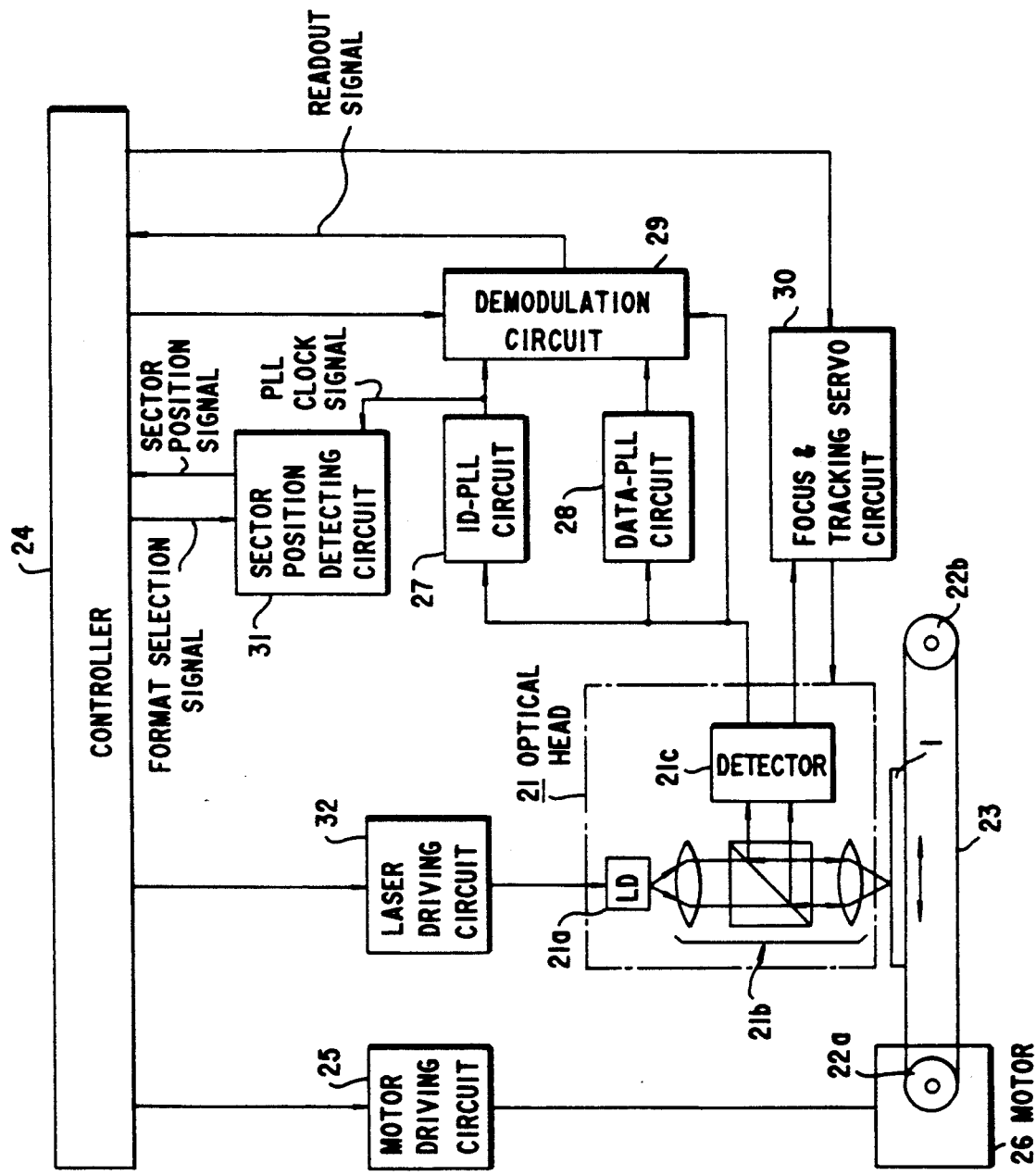
FIG. 5 is a block diagram showing an embodiment of the apparatus according to the invention.

FIG. 5 is a block diagram showing an embodiment of the recording and/or reproducing apparatus according to the invention which utilizes the optical card depicted in FIG. 4. In the present embodiment, the recording and/or reproducing of the data is effected by moving the optical card 1 with respect to an optical head 21 in a direction parallel to a track direction in which the track extends and by moving the optical head with respect to the optical card in a direction perpendicular to said track direction. The optical card 1 is placed on a conveying belt 23 provided between pulleys 22a and 22b and is moved in the track direction in a reciprocal manner under the control of a controller 24 by means of a motor driving circuit 25 and a motor 25 coupled with the pulley 22a. Controller 24 controls the operation of motor driving circuit 25, demodulates circuit 29, focus tracking servo circuit 30, sector position detecting circuit 31 and laser diode driving circuit 32, as shown in FIG. 5.

The optical head 21 comprises a laser diode 21a which emits a recording or reproducing laser light beam, an optical system 21b including collimator lens, beam splitter and objective lens, and a photodetector 21c which receives a light beam reflected from the optical card 1 and produces an output signal. The output signal from the photodetector 21c is supplied to ID-PLL(phase locked loop for reproducing the identification data recorded in the ID regions) circuit 27, DATA-PLL(phase locked loop for reproducing the data recorded in the data portion) circuit 28 and demodulating circuit 29. The ID-PLL circuit 27 produces a PLL clock signal for reproducing the ID regions of ID parts 7a and 7b and having a frequency synchronously locked in accordance with the output signal generated from the photodetector 21c when the PLL synchronizing region 8a or 8b is read out. The DATA-PLL circuit 28 generates a PLL clock signal for reproducing the data recorded in the data portion 15 in accordance with the output signal produced by the photodetector when PLL synchronizing signals recorded on both ends of a sector in the data portion are read out. The output signal from the photodetector 21c is also supplied to a focusing and tracking servo circuit 30 which produces focus error signal and track error signal. These error signals are supplied to the optical head 21 and the light spot projected onto the optical card 1 always follows the track in an in-focused condition. Generally the focusing control is performed by moving the objective lens in its optical axis direction in accordance with the focusing error signal, and the tracking control is effected by moving the objective lens in a tracking direction perpendicular to the track direction in accordance with the tracking error signal. The tracking control may be performed by moving the whole optical head in the tracking direction.

The ID-PLL clock signal and DATA-PLL clock signal generated by the ID-PLL circuit 27 and DATA-PLL circuit 28 are supplied to the demodulation circuit 29. The demodulation circuit 29 then demodulates the output signal from the photodetector 21c under the control of the controller 24. The thus demodulated signal is supplied to the controller 24 to obtain the reproduced track address and data signal. The ID-PLL clock signal produced by the ID-PLL circuit 27 serves to maintain the frequency locked with the reproduced signal of the PLL synchronizing region 8a or 8b for a time period during which the optical card 1 is moved in the forward or backward direction. This ID-PLL clock signal is also supplied to a sector position detecting circuit 31 to derive a sector position signal.

Upon reproducing, the controller 24 supplies to the sector position detecting circuit 31 a format selection signal indicating a kind of the track format of a relevant optical card. Then the controller controls the laser diode 21a via a laser diode driving circuit 32 to emit a laser light beam having a low power for reproducing the signal out of the optical card. At the same time, the motor 26 is driven via the motor driving circuit 25 to move the optical card with respect to the optical head 21. Further a desired sector in a desired track is accessed on the basis of the track address signal generated by the demodulating circuit 29 and the sector position signal corresponding to the track format. Upon recording, at first the track format selection signal is supplied to the sector position detecting circuit 31, said sector selection signal indicating a track format of a desired track. After the desired track has been seeked by reading the ID portion of the desired track, a desired sector in this track is found by using the sector position signal in a manner which will be explained later. Then, the laser diode 21a is driven to emit the laser light beam having a sufficiently high power for effecting the recording by means of the laser diode driving circuit 32. The recording laser light beam is modulated in accordance with a signal to be recorded. In this manner, the data can be recorded correctly in the desired sector in the desired track.

The sector position detecting circuit 31 generates the sector position signal in accordance with track format selected by the format selection signal supplied from the controller 24 each time the light beam emitted from the optical head 21 is made incident upon a position corresponding to a boundary between successive sectors on the optical card 1.

Figure 6:
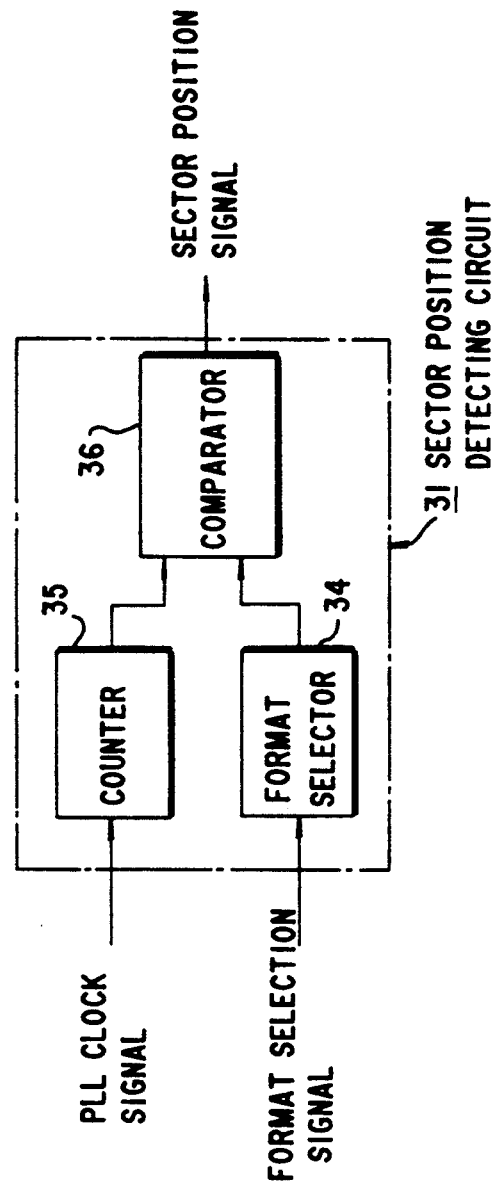
FIG. 6 is a block diagram representing the detailed construction of the sector position detecting circuit shown in FIG. 5.

FIG. 6 is a block diagram illustrating an embodiment of the sector position detecting circuit 31. The sector position detecting circuit 31 comprises a format selector 34 which receives the format selecting signal and generates a reference value indicating the position of the boundary of sectors on the optical card, i.e. start points of sectors, a counter 35 counting the ID-PLL clock signal supplied from the ID-PLL circuit 27, and a comparator 36 which compares a count value of the counter 35 with the reference value supplied from the format selector 34 and produces the sector position signal when the count value becomes identical with the reference value. To this end, the track format data should include the length of sectors or the number of sectors. It should be noted that the counter 35 is reset to an initial value when the optical head 21 comes in a reference position with respect to the optical card 1. For instance, the counter 35 is reset to zero when one of the byte synchronizing signals 9a, 10a and 11a is detected and then a succeeding ID region is reproduced. When it is confirmed that the first ID region 12a has been reproduced, the initial zero count of the counter is remained unchanged, but when the second ID region 13a has been reproduced, a value corresponding to a distance between the ID regions 12a and 13a is preset in the counter. When it is confirmed that the third ID region 14a has been recorded, the counter is preset to a value corresponding to a distance between the first and third ID regions 12a and 14a. In this manner it is possible to avoid an error in presetting an initial value in the counter 35 due to a possible error in detecting the byte synchronizing signals. As described above, the first, second and third ID regions includes their own ID numbers, so that it is possible to distinguish these ID regions from one another. The sector position signal thus obtained is counted in the controller 24 to identify the desired sector. It should be noted that a counter for counting the sector position signal may be provided in the sector position detecting circuit 31 an a count value of this counter may be supplied to the controller 24.

The ID-PLL clock signal generated by the ID-PLL circuit 27 has a repetition frequency which corresponds to a pitch of several micron meters on the optical card, so that it is possible to detect the position of the sectors very precisely during the data recording or reproducing operation.

Figure 7:
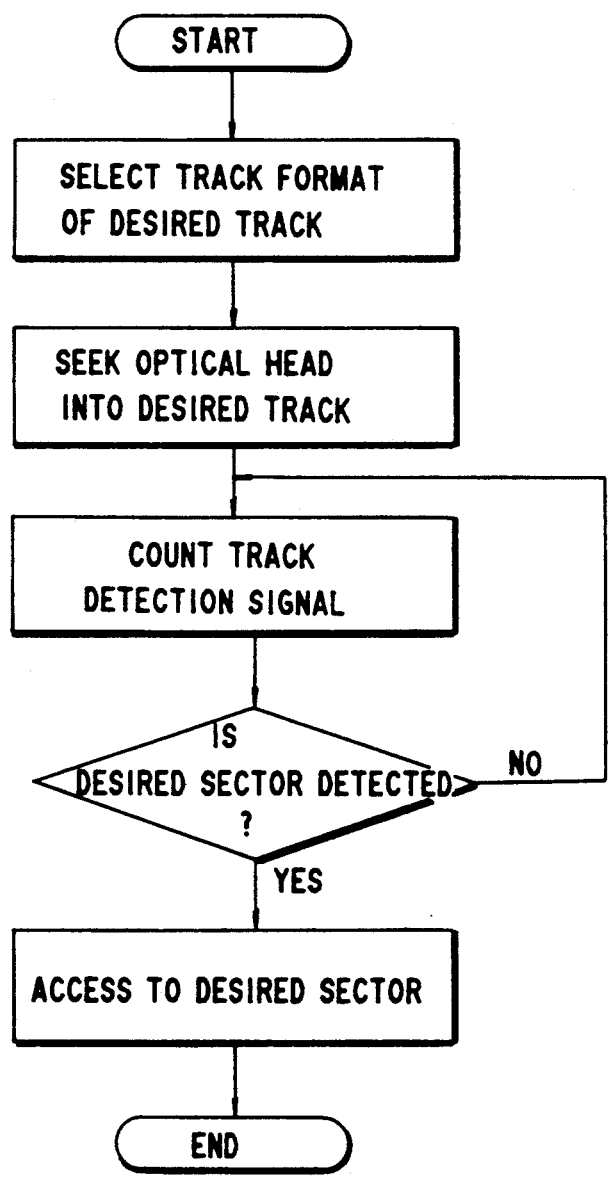
FIG. 7 is a flow chart for explaining the operation of the apparatus according to the invention.

FIG. 7 is a flow chart for explaining the operation of accessing a desired sector in a desired track on the optical card having the track format illustrated in FIG. 4 in the recording and/or reproducing apparatus according to the invention. At first the format selection signal is supplied to the sector position detecting circuit 31 in order to indicate a track format of the desired track. Then the optical head 21 is moved to access the desired track by reading the ID portion. That is to say, when the optical head 21 is moved from the left hand end to the right hand end of the optical card (hereinafter this direction is called the forward direction), the ID regions 12a, 13a and 14a in the ID portion 7a are successively read out and then the track address is detected by using a majority circuit. When the optical card is scanned in the backward direction, i.e. from the right hand end to the left hand end, the ID regions 12b, 13b and 14B are successively read out and then the track address is detected by the majority circuit. As explained above, in the ID regions 12a, 12b, 13a, 13b,14a and 14b the same track address is recorded, so that the majority circuit can determine the track address by comparing the track addresses read out cf these ID regions 12a, 13a, 14a or 12b, 13b, 14b. After confirming that the optical head 21 has been accessed into the desired track on the optical card, the optical card is moved with respect to the optical head in the track direction, and the sector position signals supplied from the sector position detecting circuit 31 are counted by a counter provided in the controller 24. This counter is reset each time the moving direction of the optical card is changed or reversed. When the count value of the counter has reached a value corresponding to the desired sector number, the access to this sector is initiated. The confirmation of the sector number is carried out in the following manner. It is assumed that the desired track including the desired sector has such a track format that the relevant track is divided into four sectors. When the optical card is moved in the forward direction, a count value of 1 corresponds to the first sector, a count value of 2 the second sector, a count value of 3 the third sector and a count value of 4 corresponds to the fourth sector. When the optical card is moved in the backward direction, a count value of 1 corresponds to the fourth sector, a count value of 2 the third sector, a count value of 3 the second sector and a count value of 4 corresponds to the first sector. The forward movement and the backward movement can be distinguished from each other by monitoring the motor driving circuit 24.

In the present embodiment, any desired number of sectors for various applications can be provided in a single track without forming the pre-recorded areas such as the sector marks in the track, so that the data record area of the optical card can be utilized efficiently. Furthermore, the recording or reproducing start point of each sector can be determined by the output signal from the sector position detecting circuit in regardless of the condition of previously recorded sectors, and therefore an arbitrary sector can be accessed. Moreover, the recording or reproducing of data in a forward or a backward direction can be initiated easily by changing the detection mode of the sector number on the basis of the count value of the sector position signals in accordance with the moving direction of the optical card.

Figure 8:
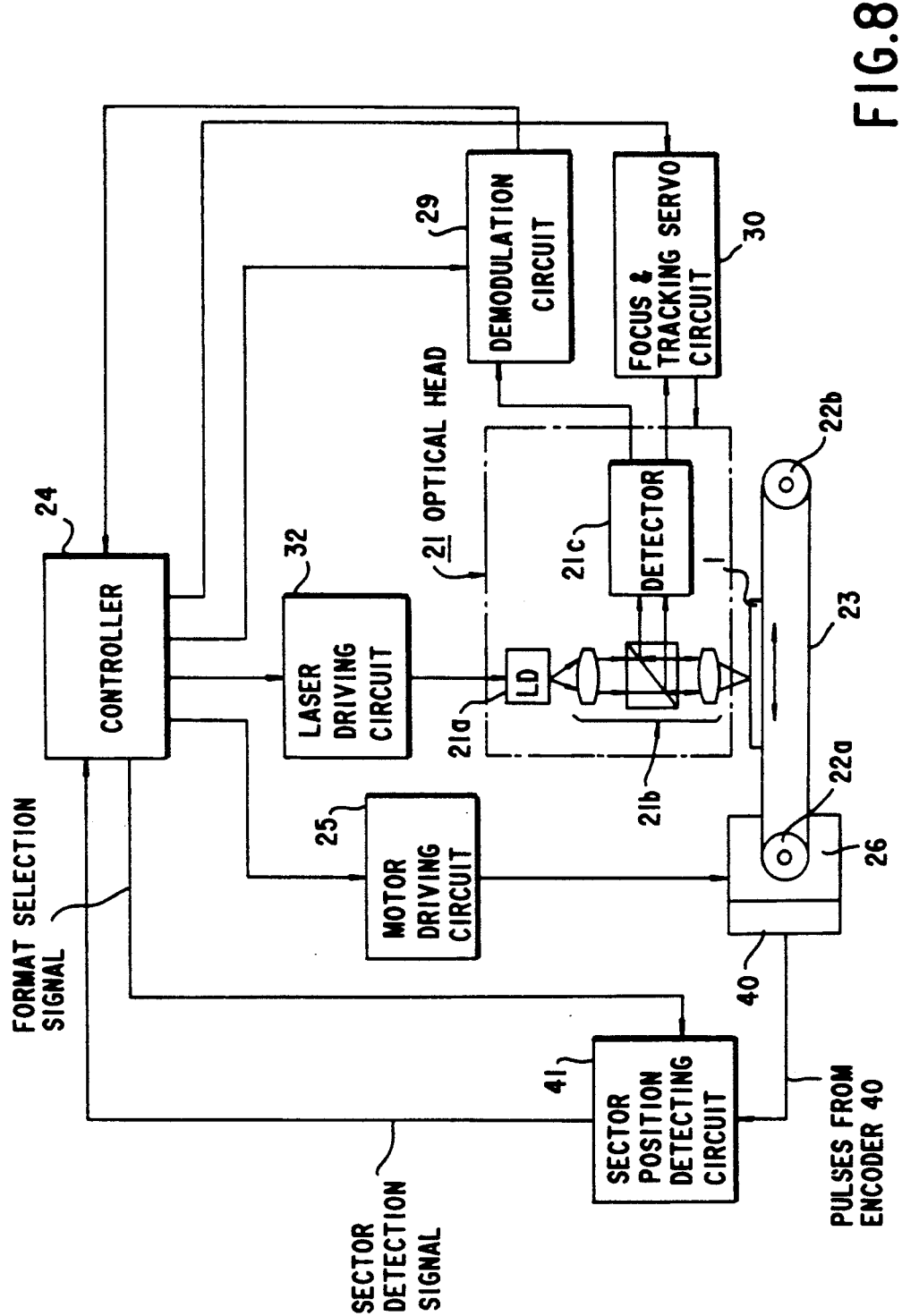
FIG. 8 is a block diagram illustrating a second embodiment of the apparatus according to the invention.

FIG. 8 is a block diagram showing a second embodiment of the data recording and/or reproducing apparatus according to the invention. In the present embodiment, portions similar to those of the first embodiment are denoted by the same reference numerals used in FIG. 5 and their detailed explanation is dispensed with. In this embodiment, the position of the optical card with respect to the optical head is detected by processing a signal which is generated by the driving means for moving the optical card with respect to the optical head. To this end, to the motor 26 for driving the optical card 1 with respect to the optical head 21 is coupled a rotary encoder 40, and an output signal of the encoder is supplied to a sector position detecting circuit 41. The controller 24 supplies the track format selection signal to the sector position detecting circuit 41. When the motor 26 is driven to move the optical card 1, the encoder 40 generates output pulses, the number of which is proportional to a distance over which the optical card is moved. Therefore, by comparing the number of pulses generated by the encoder 40 with a reference value denoted by the track format selection signal, it is possible to detect the position of the light spot projected by the optical head onto the optical card.

Figure 9:
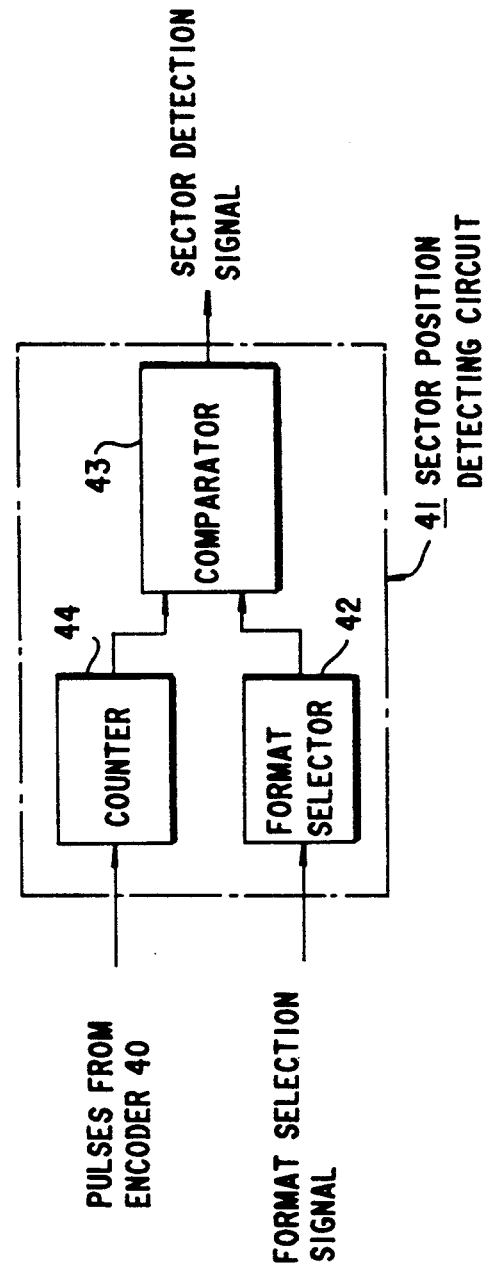
FIG. 9 is a block diagram showing the detailed construction of the sector position detecting circuit shown in FIG. 8.

FIG. 9 is a block diagram illustrating the detailed construction of the sector position detecting circuit 40. The sector position detecting circuit 40 comprises a format selector 42 which receives the format selection signal supplied from the controller 24 and produces a reference value corresponding to a start point of a desired sector, a counter for counting the pulses supplied from the rotary encoder 40 and a comparator 43 for comparing the count value of the counter 44 with the reference value supplied from the format selector 42 to produce a sector detection signal when these values become equal to each other. That is to say, the comparator 43 generates the sector position signal when the light beam emitted from the optical head 21 is made incident upon a start point of the desired sector. The counter 44 is reset when the light spot is made incident upon a reference point on the optical card 1 such as an edge of the optical card and the ID marks 8a, 8b shown in FIG. 4. The sector position signal is supplied to the controller 24 and is counted therein to detect the sector number. Also in this embodiment, such a counter may be provided in the sector position detecting circuit 40. It should be noted that the rotary encoder 41 can generate pulses each time the optical card 1 is moved over a distance of about 50 to 100 μm, it is possible to obtain a sufficiently high precision for recording or reproducing the data on or from the optical card.

In the second embodiment shown in FIG. 8, the position of the optical card 1 with respect to the optical head 21 is detected by providing the rotary encoder coupled to the motor for driving the optical card. It is also possible to provide a linear encoder which is secured to a member for holding the optical card onto the conveying belt 23. Such a card holding member is usually called the shuttle. Further the position of the optical card may be detected by means of a potentiometer.

Figure 10:
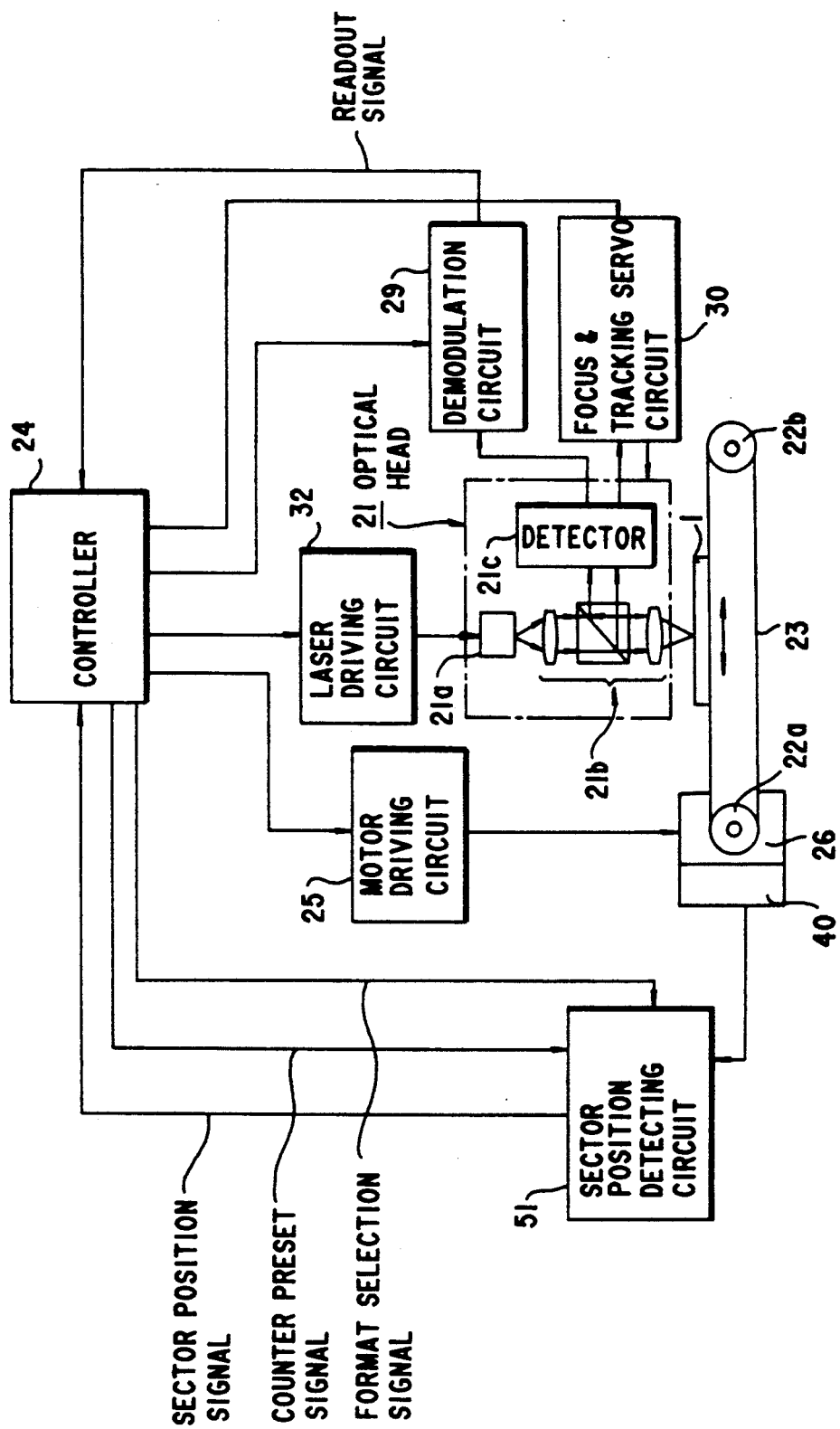
FIG. 10 is a block diagram depicting a third embodiment of the apparatus according to the invention.

FIG. 10 is a block diagram illustrating a third embodiment of the recording and/or reproducing apparatus according to the invention. In the present embodiment portions similar to those of the second embodiment shown in FIGS. 8 and 9 are denoted by the same reference numerals used in FIGS. 8 and 9. The third embodiment differs from the second embodiment in that a sector position detecting circuit 51 is constructed to have a property for correcting the pulses supplied from the rotary encoder 40. In the above embodiment, the position of the start point of a desired sector is detected by processing the output signal generated by the rotary encoder, and, therefore, if the output signal of the rotary encoder has noise superimposed thereon or one or more output pulses of the rotary encoder are lost, it is impossible to detect the position of the sector accurately. Such a drawback also occurs in the case in which the linear encoder is used instead of the rotary encoder. In such a case it is necessary to retry the accessing operation once more. In the present embodiment, the output signal of the rotary encoder is corrected on the basis of the PLL clock signal.

Figure 11:
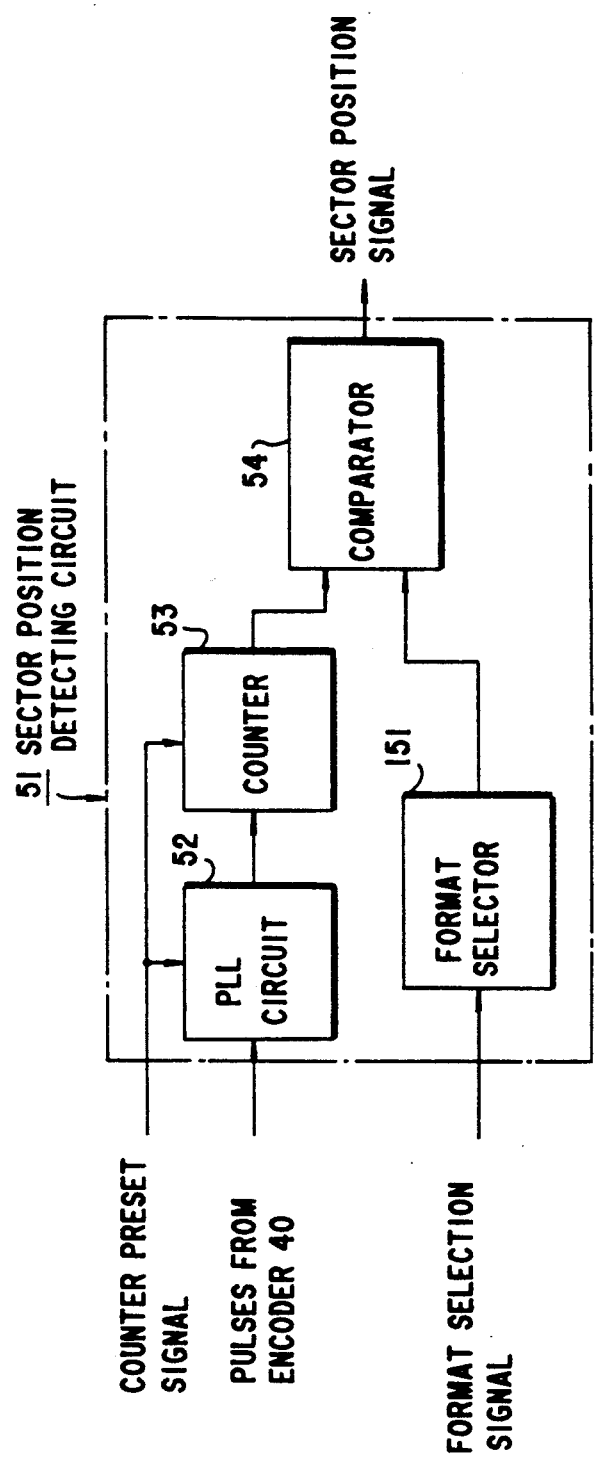
FIG. 11 is a block diagram illustrating the detailed construction of the sector position detecting circuit shown in FIG. 10.

As depicted in FIG. 10, to a sector position detecting circuit 51 are supplied from the controller 24 not only the track format selection signal, but also a counter preset signal. FIG. 11 is a block diagram showing the detailed construction of the sector position detecting circuit 51. The sector position detecting circuit 151 comprises a format selector 51 for generating a reference value denoting a separation point of sectors in accordance with the format selection signal supplied from the controller 24, PLL circuit 52 for correcting the output pulse signal supplied from the encoder 40 to generate a corrected pulse signal, a counter 53 for counting the corrected pulse signal supplied from the PLL circuit 52, and a comparator 54 for comparing a count value of the counter 53 with the reference value supplied from the format selector 151 to generate the sector position signal when these values become equal to each other.

FIG. 12 is a block diagram showing an embodiment of the PLL circuit 52. The PLL circuit comprises phase comparator 61, low pass filter circuit 62 and voltage controlled oscillator (VCO) 63. The low pass filter circuit 62 includes a switch 62a driven by the counter reset signal supplied from the controller 24 and first and second low pass filters 62b and 62c having longer and shorter time constants, respectively. The phase comparator 61 compares a phase difference between the pulse signal supplied from the rotary encoder 40 and the oscillation signal generated by the VCO 63 and generates a voltage signal representing the detected phase difference. This voltage signal is applied via the low pass filter 62 to the VCO 63 as the control voltage to change the oscillation frequency of the VCO such that said phase difference becomes zero. In this manner, the VCO 63 can generate the pulse signal which is synchronized with the pulse signal generated by the rotary encoder 40.

The output pulse signal generated by the rotary encoder 40 coupled with the output shaft of the motor 26 might be lost as shown in FIG. 13A or a spurious pulse might be produced as illustrated in FIG. 13B due to electrical noise induced on the electrical conducting means or dust and debris applied on the rotary encoder. When the output pulse signal from the rotary encoder 40 is lost as shown in FIG. 13A, the PLL circuit 61 operates to correct such a defect in the output pulse signal in the following manner. When the output pulse signal supplied from the rotary encoder 40 has no defect, the phase comparator 61 generates a voltage having a constant magnitude and the VCO 63 produces the corrected pulse signal having a constant frequency. But when one of the output pulses supplied from the encoder 40 is lost, the phase comparator 61 generates such a voltage that the VCO 63 oscillates at a lower frequency. However, the output voltage of the phase comparator 61 is applied to the VCO 63 by means of the first low pass filter 62b having a longer time constant, so that the output voltage of the low pass filter circuit 62 does not change and the oscillation frequency of the VCO 63 is not decreased. When a spurious pulse is generated as illustrated in FIG. 13B, the output voltage of the phase comparator 61 is changed such that the oscillation frequency of the VCO 63 is reduced. However, also in this case, the output voltage of the low pass filter circuit 62 does not vary, because the first low pass filter 62b having the longer time constant is connected into the circuit. Therefore the oscillation frequency of the VCO 63 does not change. In this manner, the oscillation frequency of the VCO 63 is always kept constant in regardless of the defect in the output pulse signal supplied from the rotary encoder 40.

The counter 53 shown in FIG. 11 is reset each time the light spot is made incident upon a predetermined point on the optical card such as the end points of the ID portions 7a and 7b. The frequency of the output pulse signal generated by the rotary encoder 40 gradually increases from zero from a timing at which the driving of the optical card 1 is started, and becomes constant after the speed of the movement of the optical card has arrived at a constant speed. However, the change of the output voltage of the PLL circuit 33 in accordance with the increase in the moving speed of the optical card 1 could not be predicted until the output voltage becomes a constant value corresponding to a constant speed of the optical card. Therefore, in the present embodiment, the counter 53 is preset by the preset signal supplied from the controller 24 after the moving speed of the optical card has arrived at the constant speed, i.e. the ID portion 7a or 7b has been read out.

Further the PLL circuit 52 has to generate the output pulse signal which is synchronized with the output pulse signal generated by the rotary encoder 40 coupled with the motor 26 for driving the optical card 1 until the ID portion 7a or 7b has been read out by the controller 24. That is to say, the PLL circuit 52 must respond to the change in the output pulse signal from the rotary encoder 40. Therefore, during the ID portion 7a or 7b is read out, the switch 62a is driven to connect the second low pass filter 62c having the small time constant into the circuit. When the ID portion 7a or 7b has been read out, the counter 53 is reset by the reset signal and at the same time the switch 62a is changed to connect the first low pass filter 62b having the large time constant into the circuit. When the movement of the optical card 1 is stopped, the switch 62a is driven again to connect the second low pass filter 62c into the circuit.

Also in the present embodiment, the sector detection signals supplied from the sector position detecting circuit 51 each time the optical card 1 is moved over a predetermined distance equal to a length of the sectors denoted by the format selection signal are counted by the controller 24.

In the above mentioned third embodiment, the PLL circuit 52 is constructed such that the VCO 63 generates the corrected pulse signal whose frequency is identical with that of the output pulse signal supplied from the rotary encoder 40. However, the PLL circuit 52 may be constructed to generate a signal whose frequency is equal to an integer multiple of that the output pulse signal of the rotary encoder and then the frequency of this signal may be divided to derive a corrected pulse signal having a frequency equal to that of the output pulse signal from the encoder.

In the second and third embodiments explained above, the reproduction of the data is carried out by utilizing a sector in a track as a unit, but the present invention may be effectively applied to a case in which the data is recorded in one or more blocks provided in a single sector. That is to say, a single sector is divided into a plurality of blocks and re-synchronizing patterns are recorded between successive blocks. In case of using such an optical card, the data read out of the blocks is stored in a plurality of buffer memories provided in the controller. When a re-synchronizing pattern could no be detected correctly due to any failure, data read out of a next block whose re-synchronizing pattern is correctly detected can be stored in a corresponding buffer memory under the control of the position signal generated by the counter 44 or 53.

As explained above in detail, according to the present invention the start point of a desired sector in a track can be correctly confirmed in regardless of the condition of the data recorded on the optical card by detecting the relative position of the optical card with respect to the optical head, and therefore the recording and /or reproducing of the data can be carried out precisely for any desired sectors having different lengths corresponding to various applications without providing pre-recorded sector marks between successive sectors, while the optical card is moved with respect to the optical head in both the forward and backward directions, so that the record area of the optical card can be utilized efficiently without forming wasted areas, and the access time can be reduced.

Next, the fourth embodiment is provided with a position correcting means for correcting a relative position of the optical card to the optical head on the basis of the data read out from the optical card. This embodiment will be explained as follows.

Figure 14:
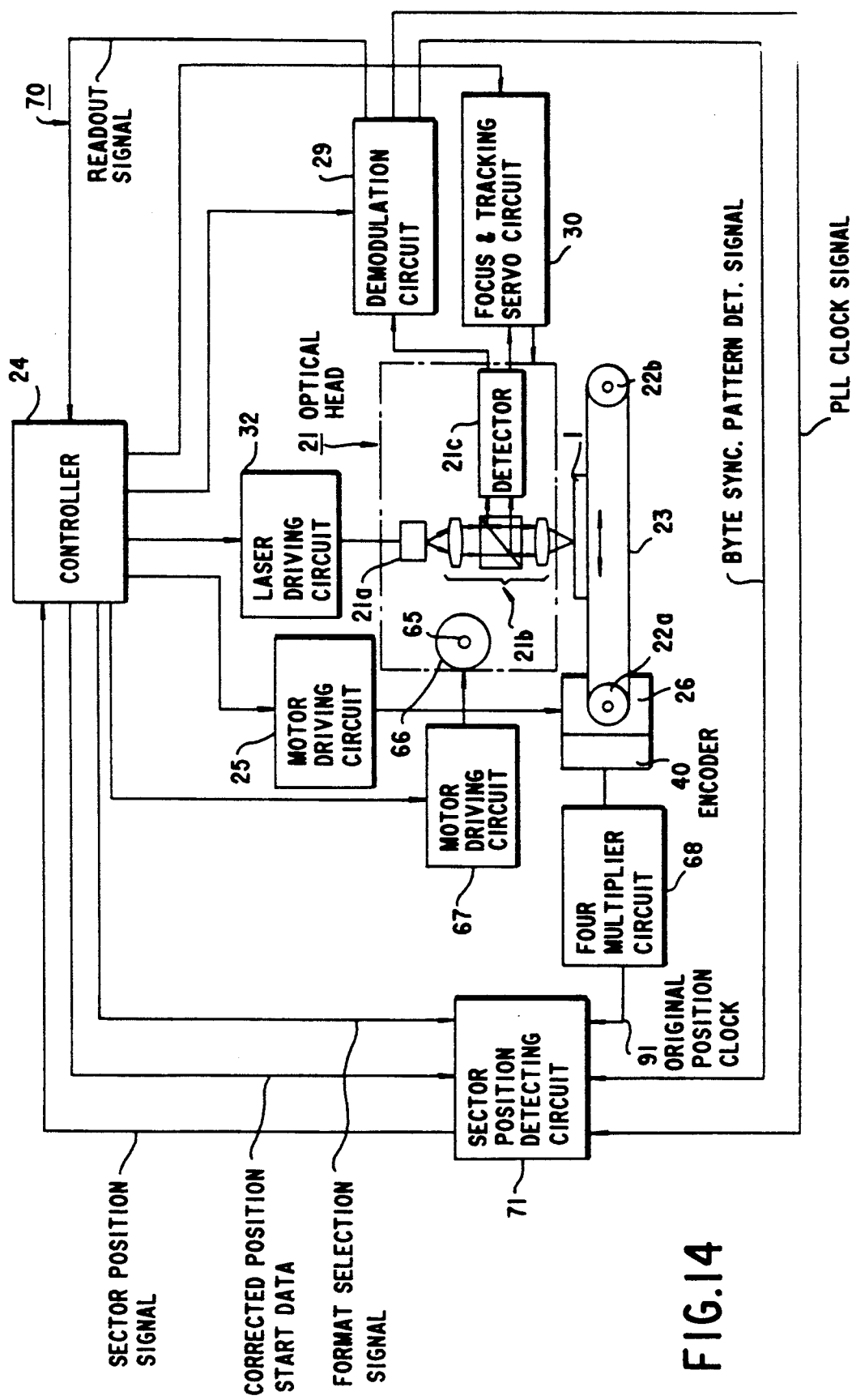

As shown in FIG. 14, the whole construction of the apparatus for recording and/or reproducing data on and/or from the optical card 70 of the fourth embodiment resembles the apparatus shown in FIG. 10.

The readout signal generated from the demodulation circuit 29 is supplied to the controller 24. The PLL clock signal and the byte synchronizing pattern detecting signal which are generated from the demodulation circuit 29 are supplied to a sector position detecting circuit 71. The format selection signal from the controller 24 and the corrected position start data are supplied to the sector position detecting circuit 71. Further, an original position clock 91 in which the encoder output corresponding to the moving amount of (the optical card 1 placed on) the conveying belt 28 from the encoder 40 is quadrupled at a four multiplier circuit 68 and supplied to the sector position detecting circuit 71. The detecting circuit 71 corrects the deviation in which the encoder output is deviated from the reference position on the optical card 1 from these input signals and generates a corrected position clock (which is synchronized with the reference position). By using the corrected position clock, the detecting circuit 71 supplies a sector position (detecting) signal to the controller 24.

In this embodiment, the optical head 21 is fitted to a feed screw 65 which is extended perpendicularly to the conveying direction of the conveying belt 23(in the perpendicular direction of a sheet in FIG. 19). The screw 65 is rotatively driven by a motor 66. The optical head 21 moves in the crossing direction of the track in accordance with the amount that the screw 65 is rotatively driven. With the movement of the optical head 21, the light beam irradiated on the optical card 1 moves in the crossing direction of the track.

The motor 66 is rotated by the driving signal from a motor driving circuit 67 controlled by the controller 24. The controller 24 supplies a control signal to the motor driving circuit 67 in accordance with the moving direction or distance to the track which is targeted from the present irradiating position of the light beam. In this embodiment, the light beam is moved in the crossing direction of the track so that means for seeking the target track is composed of head conveying means which moves the optical head 21 in this direction.

Figure 15:
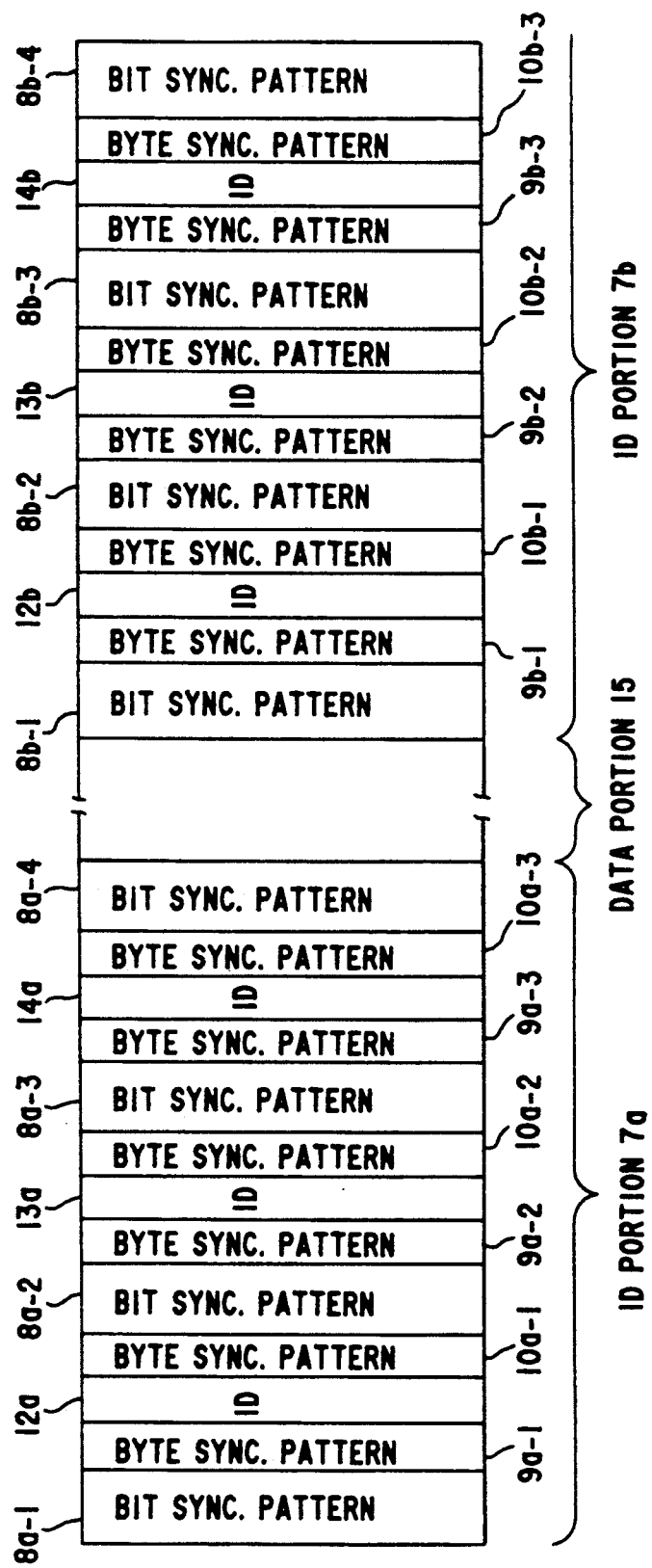

FIG. 15 shows a pre-recorded format of the track of the optical card 1 used in this embodiment. This format resembles that shown in FIG. 4. The track consists of the ID portions 7a and 7b at the both ends of the track and the data portion 15 for recording data between these ID portions. The ID portion 7a on the left side is formed of 8a-1, 8a-2, 8a-3 and 8a-4 which are the PLL synchronizing patterns (which can be written as bit synchronizing patterns, as well); 9a-1, 9a-2 and 9a-3 which are the byte synchronizing patterns indicate the beginning of the ID when the format is read from the left side; the ID 12a, 13a and 14a in which track addresses or the like are recorded; and 10a-1, 10a-2 and 10a-3 which are the byte synchronizing patterns indicate the beginning of the ID when the format is read from the right side.

Like the ID portion 7a, the ID portion 7b on the left side is also formed of 8b-1, 8b-2, 8b-3 and 8b-4 which are the bit synchronizing patterns; 9b-1, 9b-2 and 9b-3 which are the byte synchronizing patterns indicate the beginning of the ID when the format is read from the left side; the ID 12b, 13b and 14b in which track addresses or the like are recorded: and 10b-1, 10b-2 and 10b-3 which are the byte synchronizing patterns indicate the beginning of the ID when the format is read from the right side. In this embodiment, in order to increase the reliability of the track address, each ID is written threefold in the ID portions 7a and 7b on both sides. Also, in each ID (for example, 12a), an ID number is recorded with a track address to distinguish the ID from other ID. Also, because the byte synchronizing pattern and the bit synchronizing pattern are arranged on both sides of each ID, the format can be read from the both sides.

Next, referring to FIG. 16, the sector position detecting circuit 71 which is characteristic of this embodiment will be explained.

The sector position detecting circuit 71 is characterized in that a corrected position clock (see FIG. 17h) is produced so as to be always generated on every reference position on the optical card 1 to the original position clock 91 (see FIG. 17b) being quadruple of the output clock from the encoder 40 which is not related to the reference position on the card in FIG. 17 (shown by arrows in FIG. 17a, and the intervals of the arrows are equal to the intervals of the reference position clocks). Also, the above mentioned reference position is shown on the assumption that the reference position is correctly determined on the optical card 1 and the reference position is not actually placed on the optical card 1 in FIG. 17a (For example, the left end of the ID portion 7a, that is, a condition in which a generating timing of the original position clock is placed at the left end of the first bit synchronizing pattern 8a-1 is indicated as the reference position).

Figure 16:
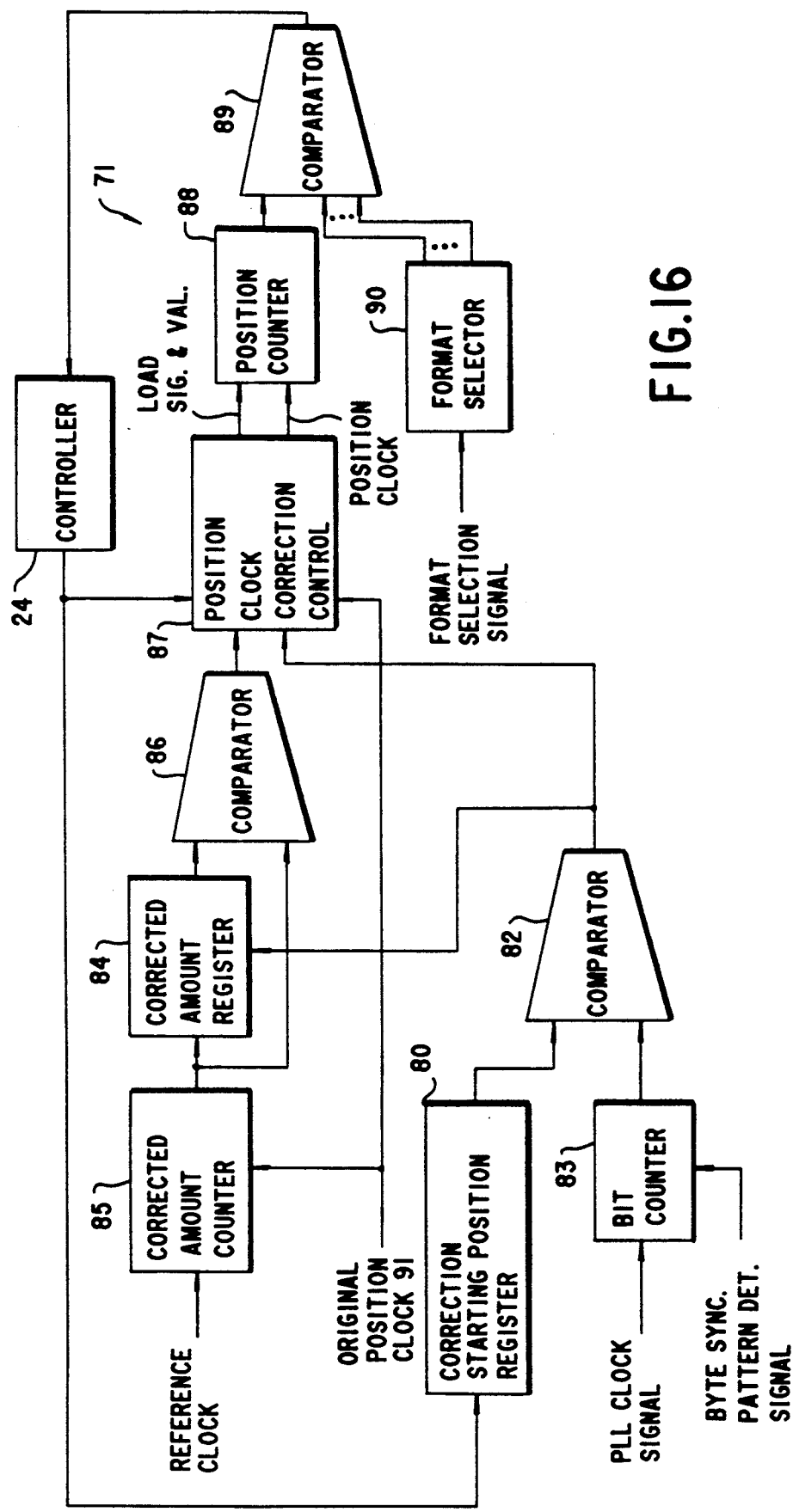

Reference numeral 80 in FIG. 16 is a correction starting position register for storing data which shows the correction starting position. The correction starting position register 80 is supplied the correction starting position data from the controller 24. The data of the correction starting position is, for example, a value N which corresponds to the seventh reference position from the left(shown by 1.7) on the card in FIG. 17a.

The data in the correction starting position register 80 is supplied to a first comparator 82 as a reference data. A count value of a bit counter 83, which counts the PLL clock signal, is supplied to the comparator 82, as well. The bit counter 83 is reset by the byte synchronizing pattern detecting signal (see FIG. 17c) from the demodulation circuit 29. Accordingly, the count value of the bit counter 83 has a measuring role for measuring the position on the optical card 1 from the byte synchronizing pattern (9a-1 in FIG. 17) to the next byte synchronizing pattern (9a-2 in FIG. 17).

The above mentioned comparator 82 compares the output of the correction starting position register 80 with the output of the bit counter 88. If the output of the register 80 and the output of the counter 83 coincide, the comparator 82 applies a coincidence signal (becomes the timing of the reference position 1.7 on the card corresponding to the data N in this example) to a corrected amount register 84. The count value of a corrected amount counter 85 is supplied to the data input end of the corrected amount register 84. The corrected amount counter 85 is reset in every generation of an original position clock 91. In other words, the original position clock 91 is used as a reset pulse to count the reference clock applied to the clock input end (for example, the clock having a frequency about 256 times as large as the constant frequency of the original position clock 91).

Accordingly, the count value of the corrected amount counter 85 has a measuring role for measuring the interval of the original position clock 91 in detail and is used to measure how the original position clock 91 is deviated from the reference position.

When the coincidence signal is generated, the above mentioned corrected amount register 84 stores the output value of the corrected amount counter 85 and supplies the output value to a second comparator 86. When the above mentioned coincidence signal is generated, a light beam becomes a timing which reaches the reference position 1.7. Therefore, the output value of the corrected amount counter 85 at that time becomes a value which counts the reference clock from the original position clock 91 just before the reference position 1.7, that is, the value is indicated by the count value (M in FIG. 17f) of the reference clock which shows the relatively deviated amount between the reference position and the original position clock 91. As mentioned in the following, the corrected position clock is sifted by the time of the original position clock 91 per the deviated amount and generated so that the corrected position clock becomes the output timing synchronized with the reference position.

Each output of the corrected amount counter 85 and corrected amount register 84 is supplied to the second comparator 86 and when the two input values coincides, the second comparator 86 supplies the coincidence signal to a position clock correction control circuit 87.

After the position clock correction control circuit 87 receives the coincidence signal from the second comparator 86. the circuit 87 corrects the original position clock 91 and supplies a load signal and a position clock signal (a coincidence signal from the second comparator 86) to a position counter 88 and makes a position clock signal which is corrected to the reference position on the optical card 1 to be generated from the position counter 88. The output signals from the original position clock 91 and the first comparator 82 are supplied to the position clock connection control circuit 87, as well. The position clock control circuit 87 is controlled by the controller 24. For example, the position counter 88 is reset by the timing in which the coincidence signal is supplied from the first comparator 82 and a preset data (106 H in FIG. 17f) corresponding to the reference position 1.7 is loaded into the position counter 88 from the controller 24 (by this timing). Also, after the position clock control circuit 87 makes the present data preset, the circuit 87 supplies the coincidence signal of the second comparator 86 to the position counter 88 as a clock signal.

That is, the position clock correction control circuit 87 provides the original position clock 91 to the position counter 88 on and before the correction starting position (reference position 1.7) in which the coincidence signal is generated from the first comparator 82. Then, the position counter 88 generates the original position clock 91 as it is and is reset by the timing of the correction starting position. Also, the data corresponding to the reference position on the optical card is preset. Behind the correction starting position, the position counter 88 counts the coincidence signal of the second comparator 86 being a clock signal in which the generating timing of the original position clock 91 is shifted so as to generate the corrected position clock synchronized with the reference position.

The output of the position counter 88 is supplied to a third comparator 89. A predetermined value corresponding to the end position of the sector on the optical card 1 is also supplied to the comparator 89 in accordance with a format selection signal from a format selector 90. When both output values coincides, the comparator 89 provides a sector position detecting signal to the controller 24. The other structure is the same as shown in FIG. 10.

Next, the operation of the sector position detecting circuit 71 will be explained by referring to FIG. 17.

For example, a forward direction access is explained and the left end of the ID portion 7a is controlled to 100 H as the value of the position counter 88. First of all, when the optical head 21 comes to the ID portion 7a, the demodulation circuit 29 supplies a PLL clock signal corresponding to a pit on the optical card 1. A bit counter 88 counts the PLL clock signal. When the byte synchronizing pattern detecting signal (29.1 in FIG.

17c) is generated from the demodulation circuit 29, the bit counter 83 is reset as shown in FIG. 17d and again continues counting the PLL clock signal.

That is, the value of the bit counter 83 corresponds to a pit position on the optical card 1 (the arrangement such as the bit synchronizing pattern 8a-1 and the byte synchronizing pattern 9a-1 is made to be a cycle). At this time, the controller 24 reads the ID 7a by the demodulation circuit 29 and supplies the correction starting position data (value N in FIG. 17) to the correction starting position register 80. The value N corresponding to an ID number is predetermined. In this example, as shown in FIG. 17a, the value N is a value of the distance between (the position of) the byte synchronizing pattern 9a-1 and the seventh reference position 1.7 (from the left end on the optical card 1) and the distance is measured by a clock number based on the pit. Also, for the correction starting position data, since it takes time to read and judge the ID information, practically, a data corresponding to the reference position after judging the ID (12a in FIG. 17) and before the next ID (13a in FIG. 17) is prepared.

Successively, when the output value of the bit counter 83 reaches N, the coincidence signal is generated from the comparator 82 as shown in FIG. 17e. On the other hand, a corrected amount counter 85 is reset in every generation of the original position clock 91 as shown in FIG. 17f and the count operation is always performed. When the coincidence signal is generated from the first comparator 82, the output value of the corrected amount counter 85 at that time is stored in the corrected amount register 84 (M in FIG. 17g). At the same time, the position clock correction control circuit 87 supplies a load signal and load value (preset value) to the position counter 88 (in this example, the value is 106 H and when going back to the tip part of the optical card 1, it becomes 100 H) and loads the load value into the position counter 88.

Although the position clock correction control circuit 87 is supplying the original position clock 91 as it is, to the position counter 88 as the position clock (see FIG. 17i) till this point, the circuit 87 is operated so as to supply the corrected position clock to the position counter 88 during this point and the point in which the optical head 21 passes through the ID portion 7b on the opposite side.

The position clock is produced and controlled at the position clock correction control circuit 87 as follows. That is to say, the output value of the corrected amount counter 85 and the contents (that is, M) of the corrected amount register 84 are compared by the comparator 86. When the output and the contents coincides, the corrected position clock (see FIG. 17h) is supplied to the position counter 88. In this manner, after the timing in which the coincidence signal is generated from the first comparator 82, the position counter 88 counts every reference position on the optical card in FIG. 17. As shown in FIG. 17k in which the value of the position counter 88 is applied to the portion before the timing of generating the coincidence signal, a value 100 H in which the left end of the ID portion 7a is 100 H can be always obtained (as shown in FIG. 17j, 106 H is preset in the position counter 88 by the timing in that the coincidence signal is generated from the first comparator 82 so that the corrected position clock synchronized with the reference position is counted from this value). Accordingly, the starting point of recording and/or regenerating data can be made constant regardless of the installed condition of the optical card 1 on the conveying belt 23. Also, since the precision for determining the position in this case is based on the PLL clock signal, the precision becomes the minimum unit formed on the optical card 1, that is, one pit.

The output of the position counter 88 and the output value of the format selector 90 are compared by the comparator 89. When the output values coincide, a sector position detecting signal is generated.

The flow chart for accessing a desired sector in a desired track by using the apparatus for recording and/or reproducing data on and/or from the optical card 70 is similar to that as shown in FIG. 7.

When the optical head 21 moves from left to right in the track direction and reads the ID 12a, 13a and 14a in the ID portion 7a shown in FIG. 15, the track address is judged by the majority logic. When it moves from right to left, it reads the ID 12b, 13b and 14b in the ID portion 7b and the track address is judged by the majority logic.

According to this embodiment, since the relative position of the optical card 1 to the optical head 21 is corrected on the basis of the readout data from the optical card 1 to the output signal from the conveying means which conveys the optical card 1, the position of the minimum recording unit can be highly precisely determined regardless of the installed condition of the optical card 1 in the conveying means and the starting point of recording and regenerating data can be provided highly precisely. Also, because the readout data from the optical card 1 is used, it is not necessary to provide highly precise position detecting means so that the present invention has a merit in which the apparatus can be materialized at a small outlay.

If the present invention is compared with the case in which the relative position of the optical card to the optical head is detected on the basis of the means for conveying the optical card, that is, the output clock signal from the encoder fitted to the motor for conveying the optical card, the present invention has a merit in the following points.

The above mentioned encoder of about 200 μm pitch is usually used. Practically, the clock signals supplied by the interval is further increased by four times and converted to the length on the optical card so that some encoder generates a clock signal generated in every 50 μm and uses the signal. Therefore, the precision for positioning the starting point for recording and regenerating data becomes about 50 μm.

In this manner, in the apparatus which judges the starting point by using the encoder output, positioning is not performed in consideration of the position information on the optical card. Therefore, the starting point of recording and/or regenerating data is fluctuated in accordance with the installed condition of the optical card in the optical card conveying means; however, in this embodiment, such fluctuation does not occur, because the position is corrected by using the position information on the optical card.

Also, when a data of high density is recorded and/or regenerated, the positioning precision of about 50 μm is not sufficient and a highly precise encoder is used to perform the positioning highly precisely by using the encoder output. That makes the apparatus more expensive, while such an encoder is not needed and the optical card can be positioned highly precisely in this embodiment.

In the fourth embodiment, the position of the left end of the ID 12a in FIG. 17 is corrected to 100 H as the value of the position counter 88; however, the position can be resetted at the reference position 1.7 and corrected to zero of the reference position 1.7.

Figure 18:
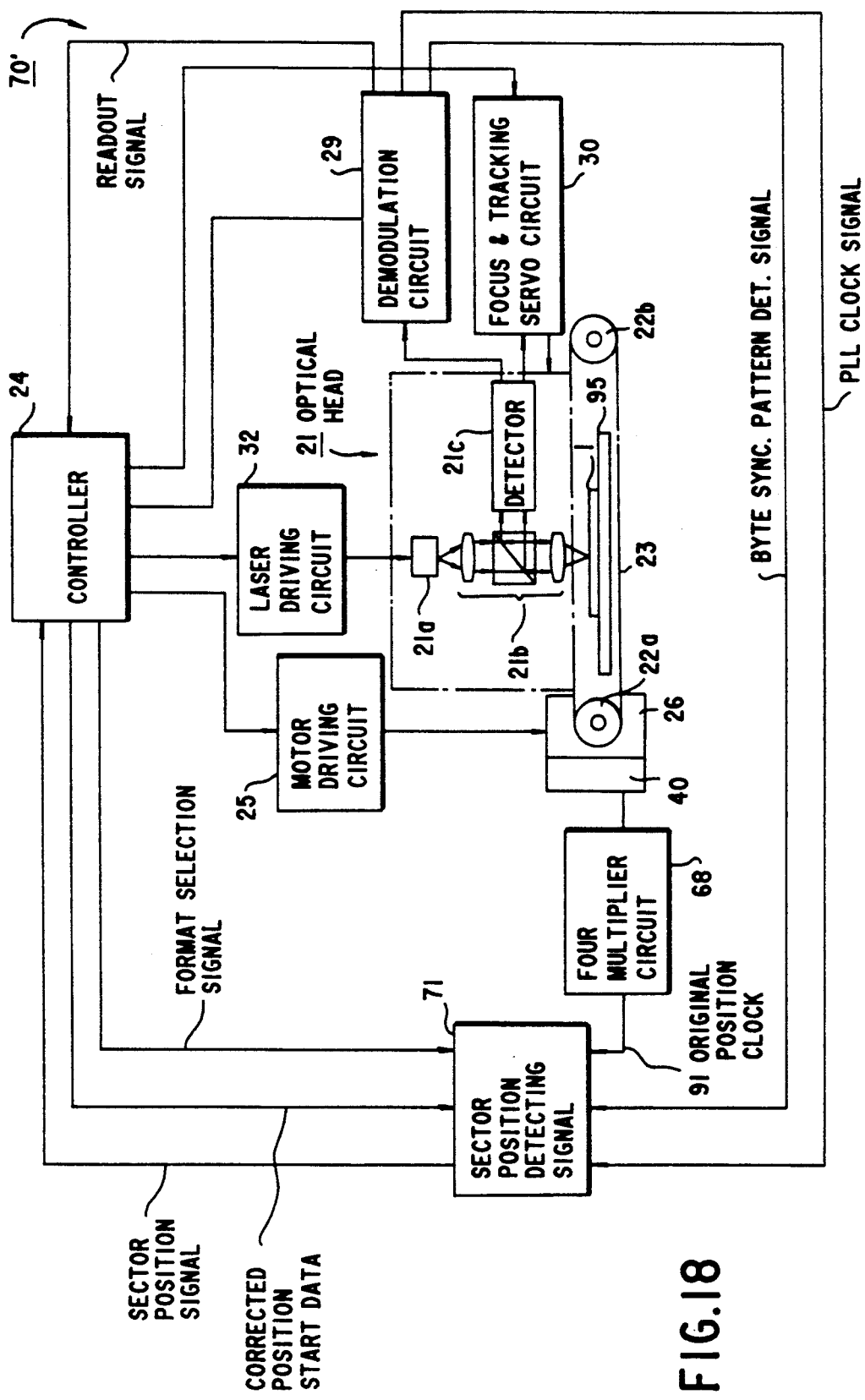
FIG. 18 is a block diagram showing the construction of the apparatus for recording and/or regenerating data on and/or from the optical card in a variation of a fourth embodiment according to the present invention.

FIG. 18 shows a variation of the fourth embodiment of an apparatus 70' for recording and/or reproducing data on and/or from the optical card. The optical card 1 is moved in the track direction in FIG. 14, while the optical head 21 is placed on or fitted to (at least, the position opposing to the objective lens) the conveying belt 23 provided with an aperture in this variation and the belt 28 is moved by using the motor 26 and the moving distance according to the motor 26 is detected by the encoder 40.

On the other hand, the optical card 1 is placed on or removably fitted to a stand 95 and moved in the crossing direction of the track by using a motor(not illustrated) so that a desired track can be accessed. The other structure is similar to the fourth embodiment.

Also, since parts of the above mentioned embodiments are combined, different embodiments can be composed. Such embodiments are also included in the present invention.

What is claimed is:

1. An apparatus for recording and/or reproducing data on and/or from an optical card comprising:
   an optical head including an objective lens for projecting a light beam onto the optical card;
   driving means for moving the optical card or optical head relative to each other in a track direction in which tracks on the optical card extend;
   position detecting means for detecting a relative position of the optical card and the optical head viewed in said track direction to derive a position signal indicating relative position at any location in the track direction without any need for pre-recorded sector marks; and
   controlling means for receiving said position signal to derive a control signal which indicates a point of a unit area on the optical card for which the data recording and/or reproducing is to be begun.

2. An apparatus according to claim 1, wherein said position detecting means comprises clock pulse generating means for generating phase locked loop clock pulses in accordance with a signal obtained b reading at least one phase locked loop synchronizing region pre-recorded in each of first and second ID portions, a counting means for counting the phase locked loop clock pulses to derive a count value, and a judging means for comparing said count value with a predetermined reference value to derive said position signal when said count value and said reference value become identical with each other, said position signal indicting start points of sectors in track.

3. An apparatus according to claim 2, wherein said judging means comprises a format selector which receives a format selection signal supplied from said controlling means and generates said reference value in accordance with said format selection signal, and a comparator for comparing said count value and said reference value with each other.

4. An apparatus according to claim 3, wherein said controlling means is constructed to derive a signal indicating the sector number by counting said position signal.

5. An apparatus according to claim 4, wherein said controlling means detects a direction of the relative movement of the optical card and optical head in the track direction to generate a direction signal, and said signal indicating the sector number is produced in accordance with said direction signal.

6. An apparatus according to claim 5, wherein said controlling means is constructed such that said format selection signal includes information indicating the number of n sectors in a track, and count values of 1, 2—n of the position signal are corresponded to the sector numbers 1, 2—n, respectively when the optical card is moved relative to the optical head in one direction and are corresponded to sector numbers n, n−1—1, respectively when the optical card is moved relative to the optical head in the opposite direction.

7. An apparatus according to claim 1, wherein said position detecting means comprises a detector for detecting the operation of said driving means.

8. An apparatus according to claim 7, wherein said driving means comprises a motor, a conveying means driven by said motor and a shuttle arranged on said conveying means for holding the optical card, and said detector comprises a rotary encoder which is coupled with said motor of the driving means and generates pulses each time said shuttle is moved over a predetermined distance.

9. An apparatus according to claim 7, wherein said driving means comprises a motor, a conveying means driven by said motor and a shuttle arranged on said conveying means for holding the optical card, and said detector is provided on said shuttle.

10. An apparatus according to claim 8, wherein said judging means comprises a format selector which receives a format selection signal supplied from said controlling means and generates said reference value in accordance with said format selection signal, a counter for counting said pulses generated by said rotary encoder to derive a count value and a comparator for comparing said count value and reference value with each other.

11. An apparatus according to claim 10, wherein said controlling means is constructed to derive a signal indicating the sector number by counting said position signal.

12. An apparatus according to claim 11, whererin said controlling means detects a direction of the relative movement of the optical card and optical head in the track direction to generate a direction signal, and said signal indicating the sector number is produced in accordance with said direction signal.

13. An apparatus according to claim 12, wherein said controlling means is constructed such that said format selection. signal includes information indicating the number of n sectors in a track, and count values of 1, 2—n of the position signal are corresponded to the sector numbers 1, 2—n, respectively when the optical card is moved relative to the optical head in one direction and are corresponded to sector numbers n, n−1—1, respectively when the optical card is moved relative to the optical head in the opposite direction.

14. An apparatus according to claim 8, wherein said position detecting means further comprises a phase locked loop circuit which receives said pulses generated by said rotary encoder and generates corrected pulses.

15. An apparatus according to claim 14, wherein said PLL circuit comprises a phase comparator, a low pass filter circuit and a voltage controlled oscillator for generating the corrected pulses, said phase comparator detects a phase difference between said pulses generated by said rotary encoder and said corrected pulses generated by said voltage controlled oscillator.

16. An apparatus according to claim 15, wherein said low pass filter circuit comprises a first low pass filter having a sufficiently large time constant for correcting a defect in the pulses generated by said rotary encoder, a second low pass filter having a sufficiently small time constant for responding to the change in speed of the movement of the optical card with respect to the optical head until the speed of the movement becomes a predetermined constant value, and a switch for selectively connecting one of said first and second low pass filters in response to a reset signal which is produced by the controlling means when the ID portion has been read out, said counter being reset by said reset signal.

17. An apparatus according to claim 1, wherein said driving means comprises moving means for moving said optical card or said optical head relative to other in said track direction, and said position detecting means generates said position signal in accordance with a moving amount by said moving means.

18. An apparatus according to claim 17, further comprising correcting means for correcting generating timing of said position signal based on a readout signal of predetermined information produced on said optical card by said optical head when moved by said moving means.

19. An apparatus for recording and/or reproducing data comprising:
- an optical head including an objective lens for projecting a light beam onto a card-like optical recording medium in which a plurality of parallel tracks extend;
- conveying means for moving said optical recording medium or said optical head relative to each other in a direction parallel to said tracks;
- position detecting means for generating a position signal indicating relative position at any location in a track direction for detecting a relative position without any need for pre-recorded sector marks of said conveying means when said conveying means is driven, to one of said optical recording medium and said optical head; and
- correcting means for reading out predetermined information produced on said tracks through a photo detector receiving a light beam projected onto said optical recording medium and for correcting the generating timing of said position signal.

20. An apparatus according to claim 19, wherein a recording and/or reproducing position is arranged on said tracks based on the position signal corrected by said correcting means.

21. An apparatus according to claim 19, further comprising second conveying means for moving said optical recording medium or said optical head relative to other in a direction of crossing said tracks.

22. An apparatus according to claim 21, wherein said second conveying means is a head moving means for moving said optical head in the direction of crossing said tracks.

23. An apparatus according to claim 19, wherein said conveying means is a medium moving means for moving said optical recording medium in a direction parallel to said tracks.

24. An apparatus according to claim 23, wherein said position detecting means for detecting a moving amount of said optical recording medium by said medium moving means and for generating said position signal.

25. An apparatus according to claim 24, wherein said position detecting means is reset by a pulse generated every predetermined moving amount by said medium moving means and comprises a counter counting a clock having a sufficiently shorter cycle than the cycle of said pulse.

26. An apparatus according to claim 23, wherein said correcting means comprises clock generating means for generating a clock synchronized with a pre-formatted phase locked loop synchronizing pattern on said tracks as said predetermined information, reference position signal generating means for counting said clock and generating a reference position signal in a reference position on said tracks and correcting position signal generating means for correcting said position signal by the generating timing of said reference position signal and for generating a correcting position signal.

27. An apparatus according to claim 26, wherein said position detecting means is reset by a pulse generated every predetermined moving amount by said medium moving means and comprises a counter counting a clock having a sufficiently shorter cycle than the cycle of said pulse, and said correcting position signal generating means comprises a pulse position correcting means for generating a pulse in which the generating timing of said pulse is shifted on each count value of said counter by the generating timing of said reference position signal.

28. An apparatus according to claim 27, wherein said pulse position correcting means comprises a register holding the count value of said counter by the generating timing of said reference position signal, a comparator generating a coincidence pulse when said count value held by said register coincides with the count value of said counter, and a second counter for counting said coincidence pulse and generating a count output as said correcting position signal.

* * * * *